T. HANVEY.
Making Staves.
No. 1,717. Reissued July 5, 1864.
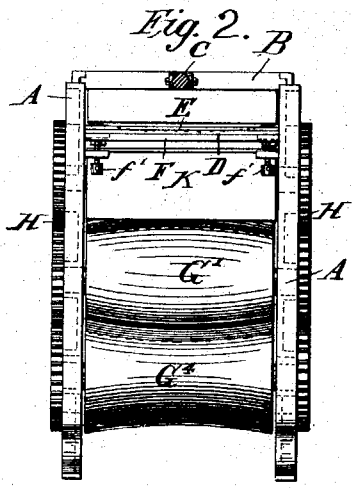
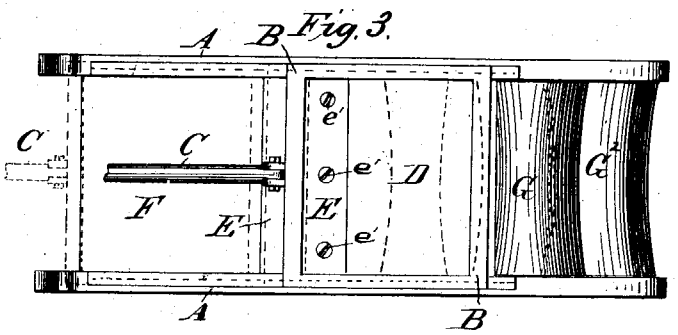
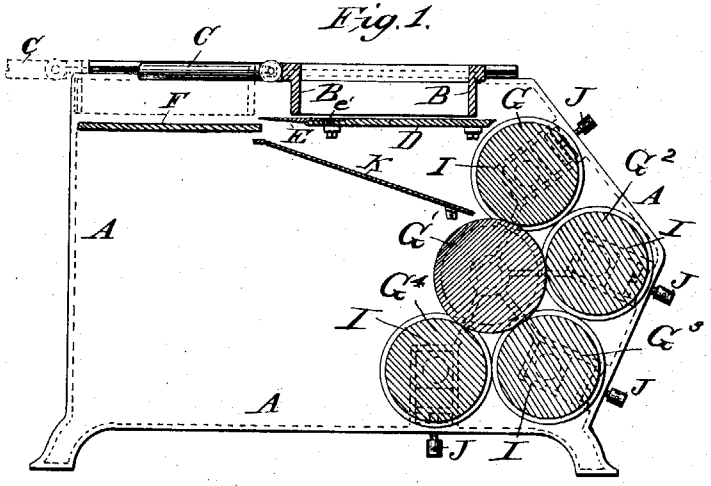
Witnesses.
E. B. Forbush
M. B. Moore.
Inventor
Thos. Hanvey
THE NORRIS PETERS CO., PHOTO-LITHO., WASHINGTON, D. C.

UNITED STATES PATENT OFFICE.

THOMAS HANVEY, OF ELMA, NEW YORK.

IMPROVEMENT IN STAVE-MACHINES.

Specification forming part of Letters Patent No. 39,649, dated August 25, 1863; Reissue No. 1,717, dated July 5, 1864.

*To all whom it may concern:*

Be it known that I, THOMAS HANVEY, of the town of Elma, county of Erie, and State of New York, have invented a new and improved Machine for Making Staves for Barrels, Casks, and Similar Articles; and I do hereby declare that the following is a full and exact description thereof, reference being had to the accompanying drawings, making a part of this specification, in which—

Figure I is a longitudinal section, Fig. II is an end elevation, and Fig. III is a top plan view, of the machine.

The nature of this invention relates—

First. To constructing and using a cutting or slicing apparatus for cutting or slicing staves from a bolt or block of wood; and it consists, mainly, of four elements, to wit: first, a four-sided box having a horizontal reciprocating movement, without a bottom, into which the block of wood which is to be cut into staves is put, and by which it is fed to the cutter; second, a stationary plate or table which supports the block, and upon which the block slides back and forth as it is moved by the box; third, a secondary table placed a little lower than the stationary table, which catches the block as it slides off the stationary table in the reverse movement for a new feed; and, fourth, a knife or cutter, which is attached by appropriate bolts or screws to the stationary table.

Second. To the application and use of a series of compression and forming rollers between which the stave passes sidewise or in a position parallel with the face of the rollers, which will not only give the stave (no matter what its width may be) the barrel form, but also compress it with so much force as to squeeze all the water out of it and "season" it, and also make it hard and smooth.

Letters of like name and kind refer to like parts in each of the figures.

A represents the main frame-work, which supports the operating parts of the machine, and may be made of cast or wrought iron or of wood.

B represents a four-sided box, open at the top and without a bottom. It is made very strong, of cast-iron, and is so formed and connected with the main frame that it will slide to and fro in a horizontal plane and carry with it the bolt or block of wood from which staves are to be cut. This box is caused to move back and forth by means of power applied in any convenient manner to a crank-wheel and connecting-rod. The connecting-rod is shown at C.

D represents a stationary plate or table, which is strongly connected with the main frame, and may be cast with it as a part thereof. This table has a twofold purpose, the first of which is to support the block of wood and make a plain, smooth surface for it to slide upon as it is moved to and from the cutter, and also for supporting the cutter, so that the upper face of the cutter may lie in the same horizontal plane with the upper face of the table. The cutter E is connected to this table by means of bolts or screws, as shown at $e'$.

F represents a secondary table, which is connected with the frame immediately forward of the cutter and placed as much lower than the edge of the cutter as the thickness of the stave to be cut. As the block, after having been fed to the cutter by the forward movement of the box, is drawn over and from the cutter by the reverse movement of the box, it falls down by its own gravity onto this table, which brings it into the proper place to be again fed to the cutter by the forward movement of the box.

The knife or cutter E is made sufficiently wide to allow it to be bolted to the stationary table D, and the edge is beveled on the under side, so that the stave which is cut from the block will be directed downwardly upon the inclined apron K, and thence carried to the forming and compression rollers.

The cutter is made of greater length than the longest stave to be cut, so that it can cut the whole length of the stave at one stroke, and in a position parallel with the grain of the wood.

The forming and compression rollers are represented at G, $G^1$, $G^2$, $G^3$, and $G^4$. These are made correspondingly concave and convex, and of sufficient length to receive a stave sidewise and give it the exact form it will have when set up in a barrel or cask. These rollers are connected with and supported by the main frame, and are driven by appropriate gearing, H, on their shafts in a common manner. They run in adjustable journal boxes, as shown by the dotted lines I, so that by means of the set-screws J they may be set so as to cause any required amount of compression force upon the stave as it passes through.

Operation: Blocks of wood are cut from the tree or log of the proper length for the kind of staves required. They are then thoroughly steamed, so as to make the wood soft and flexible. These blocks are then put into the box B (full size of the log) when the box stands at the end of its movement. Power is then applied and the box given its vibrating motion. This will, of course, give the same motion to the block of wood within the box. If the motion is commenced when the block lies upon the stationary table D, it will first be drawn back so as to drop upon the secondary table F. It then comes into position so that the forward motion of the box forces it against the cutter, which cuts or slices off a stave from the under side of the block. The stave thus cut falls upon the apron K, and is carried to the forming and compression rollers, while the block has passed onto the stationary table D, and the backward motion of the box slides it off from the stationary table and onto the secondary table, ready to be again driven forward to cut another stave, and thus the operation is continued until the block is entirely cut up.

Staves may thus be cut rapidly and as wide as the diameter of the log or block, and a great saving of labor and timber is thereby effected.

The staves thus cut are passed sidewise (as distinguished from endwise) through the forming and compression rollers, no matter what their width may be, and in their passage between these rollers they are shaped in the barrel form, and are at the same time so compressed as to force all the water out of the wood and close the pores of the wood and make it dry and hard and the outside of the stave very smooth and glossy. The staves are then jointed and crozed, and sometimes, when very large sized timber is used, staves may be made in this way so wide that three or four of them will make a barrel. A great saving in labor and material is thus effected by being able to make and use very wide staves.

I claim—

In a machine for cutting or slicing staves from a bolt or block of wood, the forming and compression rollers, so constructed and combined that the cut stave may be passed through sidewise and formed and compressed substantially as herein described.

THOS. HANVEY.

Witnesses:

BRADLEY MOORE,
JAMES B. HANVEY.